No. 11,918. Reissued July 2, 1901.

W. H. KNIGHT.

ELECTRIC MOTOR REGULATOR.

(Application filed June 7, 1901.)

WITNESSES:

Wm. H. Berrigan Jr.

Thomas Maguire

INVENTOR,

WALTER H. KNIGHT,

BY

Pitts Pitts Sheffield & Pitts

HIS ATTORNEYS.

UNITED STATES PATENT OFFICE.

WALTER H. KNIGHT, OF NEW YORK, N. Y., ASSIGNOR TO THE THOMSON-HOUSTON ELECTRIC COMPANY, OF CONNECTICUT.

ELECTRIC-MOTOR REGULATOR.

SPECIFICATION forming part of Reissued Letters Patent No. 11,918, dated July 2, 1901.

Original No. 428,169, dated May 20, 1890. Application for reissue filed June 7, 1901. Serial No. 63,667.

*To all whom it may concern:*

Be it known that I, WALTER H. KNIGHT, a citizen of the United States, residing and having a post-office address at No. 654 West End avenue, in the borough of Manhattan, in the city and State of New York, have invented certain new and useful Improvements in Electric-Motor Regulators, of which the following is a specification.

My invention (which is a division of that shown and described in Letters Patent No. 447,332, granted March 3, 1891) relates to controlling devices for electric motors. It is especially adapted for motors working on a circuit of constant potential, such as is employed for electric railways. In motors of a circuit of this character it is essential that a resistance or other device for opposing the electromotive force should be inserted in the circuit whenever the motor is at rest or its counter electromotive force substantially diminished. Since a reversal of the motor of course reverses its counter electromotive force, it is essential that it should only be reversed when the motor is at rest and when there is substantially no current passing through it. A sudden reversal of the motor when in operation so affects the counter electromotive force that unless a resistance is inserted the sudden flow of current which ensues is so great as to burn out the machine. Moreover, when the reversing device is a switch controlling the direction of current in either the field-magnet or armature it is apt to be injured by operating it while the current is passing.

My invention consists in providing an electric-motor controller of the type in which separate levers are employed for regulating and reversing with a lock or stop and an engaging flange, the parts being arranged to lock the reverser except when substantially no current is passing through the motor and to lock the regulator when the reversing device is at a neutral position.

My invention is illustrated in the accompanying drawings, wherein—

Figure 2:
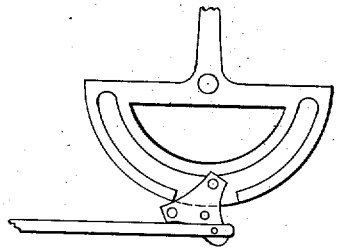
Figure 1:
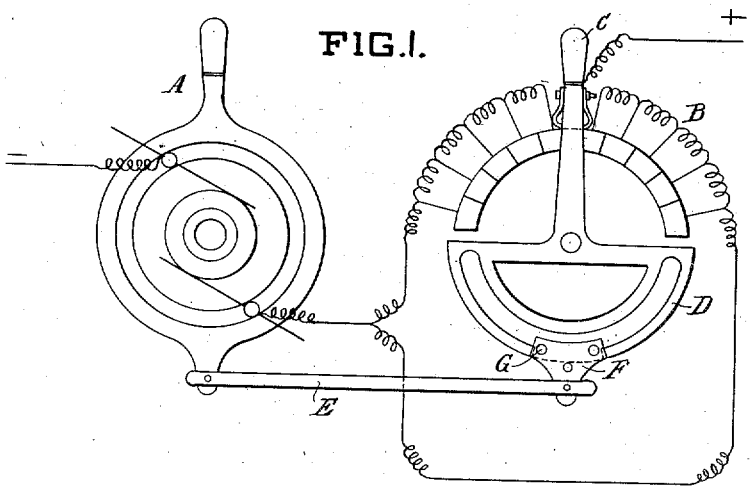
Figure 3:
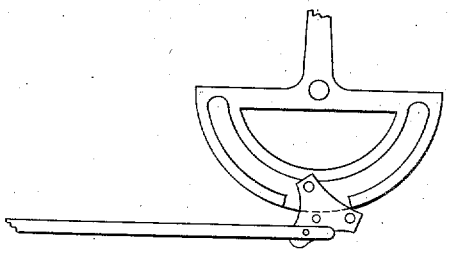

Figure 1 is a diagrammatical view of a reversing mechanism and a regulating mechanism for an electric motor so connected as to embody my invention. Figs. 2 and 3 show the alternative condition to that shown in Fig. 1, wherein the reversing mechanism is set in opposite directions, respectively.

In the drawings, A represents a reversing device for an electric motor, which in this case is shown as a lever for shifting the position of the brushes upon the commutator. The same result, however, may be accomplished by any other of the well-known means for that purpose.

B is a regulator for the motor, consisting in this case of a lever controlling the resistance, cutting out more or less of it at the will of the operator. Any other controlling device by which a variation between the direct and counter electromotive forces is prevented from causing an injurious flow of current to the motor may be employed.

C is the resistance-lever, provided with a grooved segment D.

E is a connecting-rod from the lever A, leading to a pivoted triangular block F, provided with pins G, which pins in Fig. 1 extend into a break in the lower flange of segment D and prevent any movement of lever C. In this condition the lever A is holding the commutator-brush at a neutral point, so that no lead is given to the motor and the resistance-lever cannot be turned to throw out the resistance and admit current to the motor when it is not in a condition to generate its counter electromotive force. When, however, the lever A is turned to one side or the other to give a direction to the motor, the block F is thrown into one or the other of the positions shown in Figs. 2 and 3. The pins G are then thrown out of the path of the flange of D, so that it may readily pass between them in either direction, whether the position taken be that of Figs. 2 or Fig. 3. The resistance can then be cut out and the motor operated and regulated at will; but when any of the resistance is cut out by a movement of lever C in either direction from the position of Fig. 1 the flange of D comes in between the two pins G and prevents any movement of block F, thereby locking the lever A in position. By this arrangement the lever A cannot be turned to reverse the motor until the lever C is brought back to the position of Fig. 1 with the maximum resistance in circuit.

By the device above described it will be seen that the motor is at all times safe from accident at the hands of reckless and inexperienced operators.

I am aware of United States Letters Patent No. 264,982, dated September 26, 1882, granted to Weston, and of United States Letters Patent No. 322,859, dated July 21, 1885, granted to Siemens, and of United States Letters Patent No. 335,863, dated February 9, 1886, granted to Weiss, which describe and show electric-motor controllers; but these controllers do not belong to the type in which separate levers are used for regulating and reversing, and it is possible for the motorman to improperly manipulate, through carelessness or excitement, the single lever employed and perform the two operations of the single lever in too-rapid sequence, thereby subjecting the motor to reversal of current at an improper time. I am aware also that in said Weiss patent it was proposed to qualify the operations of the single lever by the use of block and springs, so that at the time of making the reversal resistance was inserted in circuit until the reversal was completed and then removed sufficiently to supply a suitable current strength to the motor; but this device is not the equivalent of a positive lock engaging with a flange and absolutely preventing reversal of the motor until the separate handle of the regulator has been first brought to a predetermined or "off" position.

What I claim as new, and desire to secure by Letters Patent, is—

1. In an electric-motor controller of the type in which separate levers are employed for regulating and reversing, the combination, with said levers, of a lock or stop and an engaging flange arranged to lock the reverser except in a predetermined position of the regulator.

2. In an electric-motor controller of the type in which separate levers are employed for regulating and reversing, the combination, with the regulating-shaft, of a flange thereon, and a controlling connection from the reverser bearing on the said flange and freeing the reverser only when the flange is in a position corresponding to that at which substantially no current is passing through the motor.

3. In an electric-motor controller of the type in which separate levers are employed for regulating and reversing, the combination, with said levers, of a lock or stop and an engaging flange, said lock or stop being operated by the reversing device and acting to lock the regulator against movement except when the reversing device is in a predetermined position.

4. In an electric-motor controller of the type in which separate levers are employed for regulating and reversing, the combination, with said levers, of a lock or stop and an engaging flange, said lock or stop being arranged to lock the reversing device, except when substantially no current is passing through the motor and to lock the regulator when the reversing device is at a neutral position.

5. The combination, with an electric motor on a constant-potential circuit, of a reversing-lever therefor, a regulating-lever, a flanged segment on the regulating-lever, a pivoted block having stops engaging with the flange of the segment, and a connection therefrom to the reversing-lever, substantially as described.

6. In an electric-motor controller of the type in which separate levers are employed for regulating and reversing, the combination, with a flange on the regulator-shaft, of an intermediate movable piece controlling the reversing-lever and controlled by said flange.

In witness whereof I have hereunto signed my name this 1st day of June, 1901.

WALTER H. KNIGHT.

In presence of—
J. GREEN,
A. P. KNIGHT.